H. JACOBY.
TIRE DEFLATION INDICATOR.
APPLICATION FILED OCT. 23, 1911.
1,062,567.
Patented May 20, 1913.
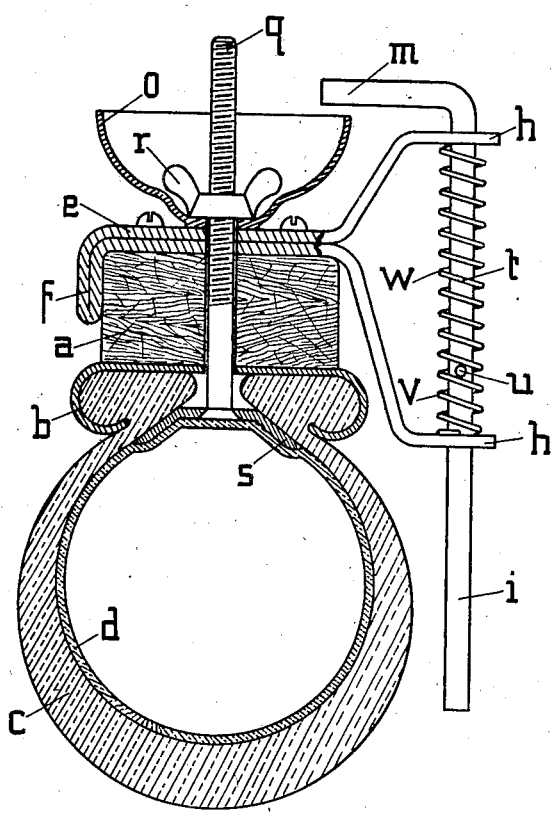
Witnesses:
Herbert J. Britz
Erich Pannehl
Inventor:
Hermann Jacoby
by B. Singer
Attorney.

UNITED STATES PATENT OFFICE.

HERMANN JACOBY, OF EBERSTADT, NEAR DARMSTADT, GERMANY.

TIRE-DEFLATION INDICATOR.

1,062,567.  Specification of Letters Patent.  Patented May 20, 1913.

Application filed October 23, 1911. Serial No. 656,202.

*To all whom it may concern:*

Be it known that I, HERMANN JACOBY, a subject of the Grand Duke of Hesse, and residing at Eberstadt, near Darmstadt, Germany, have invented certain new and useful Improvements in Tire-Deflation Indicators, of which the following is a specification.

The invention refers to devices for automatically indicating the decrease of pressure in pneumatic tires, and consists substantially therein that a spring pressed bolt, which strikes against the road is formed as a hammer for directly actuating a bell secured to the rim of the wheel.

The invention is illustrated in the accompanying drawing, wherein a sectional view of a pneumatic tire is shown with the device of my invention attached thereto.

To the wooden rim $a$, carrying the steel felly $b$ with the outer casing for the inflatable tube $d$, a support $e$ is arranged, one end $f$ of which is bent and laterally engages the wooden rim $a$. The other end of this support has two arms $h$, which are provided with guide openings for a bolt $i$, the cross section of which is polygonal. The upper end $m$ of the bolt $i$ is bent and adapted to strike against the bell $o$ which is secured to the rim $a$ by means of the screw bolt $q$. This bolt $q$ serves both for securing the tire arrangement and passes through a suitable hole of the support $e$. A thumb nut $r$, which is screwed on the bolt $q$, in combination with the head plate $s$ serves to hold the tire arrangement, the rim, the support and the bell together. Between the arms $h$ a spring $t$ encircling the bolt $i$ is disposed, which can be freely rotated. When the spring is rotated a pin $u$ passing through the bolt and engaging between the coils of the spring $t$, is displaced, so that the bent end of the bar $i$ can be adjusted opposite the bell $o$ at any desired distance. On account of this arrangement the spring $t$ serves at the same time to regulate the force of the stroke. The pin $u$ divides the action of the spring into two parts, which work against each other in such a manner that the lower spring portion $v$ acts as a buffer spring for the upper portion $w$, as without being buffed the spring $t$ would cause the hammer $m$ to strike the bell, but then it would remain on the same so that the latter could not reciprocate. In order to ascertain from the sound of the bells which of the tires has been damaged, it is preferable to select for the tires bells of different tones.

In the position shown, the tire is inflated and the lower end of the bar $i$ held above the road surface and the hammer $m$ is held out of engagement with the bell $o$. On deflation of the tire, the wheel will descend toward the road surface thereby lowering the rod $i$. When, on rotation of the wheel, the rod $i$ attains a lowermost position, it will engage the road surface and be elevated in its support $e$ thereby tensioning the upper spring portion $w$. On continued rotation of the wheel, the rod $i$ will be freed from its engagement with the road surface, thereby releasing the tension on the upper spring portion $w$ so that the resulting recoil thereof will cause the hammer $m$ to strike the bell $o$. The pin $u$ will thereby tension the lower spring portion $d$ so that the recoil of the latter will raise the hammer $m$, immediately after its engagement with the bell $o$, thereby preventing the hammer from deadening the resonance of the bell.

The spring may be rotated to change the number of convolutions of the spring, on either side of the pin $u$, thereby varying the differential action of the bumper portion $d$ and the actuator portion $w$, of said spring $t$.

It will be seen from the foregoing that the rod with its pin engaging the spring, substantially as shown, constitute spring controlled differentially acting bell striking and road engaging mechanism.

What I claim as new and desire to secure by Letters Patent is:—

1. In combination with a pneumatic tire and a wheel structure, of a device for indicating deflation of the tire comprising a bell, an element movably mounted on the structure for striking the bell and engaging the road and having a spring engaging member, and a rotatably mounted spiral spring engaging said member to control said element and adapted to be rotated to alter its spring action on said element, substantially as described.

2. In combination with a pneumatic tire and a wheel structure, of a device for indicating deflation of the tire comprising a bell, an element movably mounted on the structure for striking the bell and engaging the road, and a spiral spring, said element having means engaging the convolutions of the spring at a point nearer one end of the spring than the other, whereby, one portion of the spring acts as an operator and the other portion as a buffer, substantially as described.

3. In combination with a pneumatic tire and a wheel structure, of a device for indicating deflation of the tire comprising a bell, a single rigid element having a bell striking portion and a road engaging portion, guiding means for said element carried by said wheel structure and maintaining the road engaging portion in range of the road for retraction of the bell striking portion away from said bell upon deflation of the tire, and an actuating spring for returning said element and engaging the striking portion with said bell, substantially as described.

4. In combination with a pneumatic tire and a wheel structure, of a device carried by said structure for indicating deflation of the tire and comprising a bell, a road engaging and bell striking device, and a spring mechanism comprising actuating and bumper portions for engaging and freeing said device with and from the bell subsequent to actuation of said device upon deflation of the tire, substantially as described.

5. In combination with a pneumatic tire and a wheel structure, of a device for indicating deflation of the tire comprising a bell, an element movably mounted on said structure for striking the bell and engaging the road, a spiral spring for controlling said element, and means carried by said element and engaging the convolutions of said spring between the ends thereof whereby a differential spring action is imparted to said element upon deflation of the tire, substantially as described.

In testimony whereof I affix my signature in presence of two witnesses.

HERMANN JACOBY.

Witnesses:
   JEAN GRUND,
   CARL GRUND.